(12) United States Patent
Mokunaka et al.

(10) Patent No.: US 7,511,757 B2
(45) Date of Patent: Mar. 31, 2009

(54) DIGITAL CAMERA

(75) Inventors: Kaoru Mokunaka, Hyogo (JP); Hiroshi Ueda, Osaka (JP); Michihiko Ootsuka, Osaka (JP)

(73) Assignee: Panasonic Corporation, Osaka (JP)

( * ) Notice: Subject to any disclaimer, the term of this patent is extended or adjusted under 35 U.S.C. 154(b) by 93 days.

(21) Appl. No.: 11/764,946

(22) Filed: Jun. 19, 2007

(65) Prior Publication Data
US 2007/0291321 A1 Dec. 20, 2007

(30) Foreign Application Priority Data
Jun. 20, 2006 (JP) .............................. 2006-170039

(51) Int. Cl.
*H04N 5/225* (2006.01)
(52) U.S. Cl. .............. 348/335; 348/333.11; 348/333.12
(58) Field of Classification Search ......... 348/335–344, 348/333.11–333.12, 360
See application file for complete search history.

(56) References Cited
U.S. PATENT DOCUMENTS
5,483,284 A * 1/1996 Ishiguro ..................... 348/335
5,619,260 A * 4/1997 Miyadera .................. 348/223.1
2001/0026683 A1 10/2001 Morimoto et al.
2008/0055459 A1* 3/2008 Ito et al. ..................... 348/335
2008/0068490 A1* 3/2008 Ueda et al. ................. 348/341

FOREIGN PATENT DOCUMENTS
JP 2001-272593 10/2001

* cited by examiner

*Primary Examiner*—Tuan V Ho
(74) *Attorney, Agent, or Firm*—Hamre, Schumann, Mueller & Larson, P.C.

(57) ABSTRACT

A digital camera of the present invention includes a CMOS sensor that captures a subject image formed by an interchangeable lens to generate image data, a liquid crystal monitor that displays the generated image data, and a microcomputer having a live view mode that controls so that the generated image data is displayed as a moving image in real time on the liquid crystal monitor, and a burst mode that generates a plurality of image data with a single image pickup operation, wherein the microcomputer controls so that, in a live view mode, every time image data is generated in a burst mode, the generated image data is displayed on the liquid crystal monitor. Consequently, the generated image data is displayed on the liquid crystal monitor every time image data is generated in the burst mode, whereby the ease of use can be enhanced.

6 Claims, 7 Drawing Sheets

DIGITAL CAMERA

BACKGROUND OF THE INVENTION

1. Field of the Invention

The present invention relates to a digital camera, and in particular, to a digital camera having a movable mirror, which enables a subject image to be observed through an electronic viewfinder.

2. Description of Related Art

A digital single-lens reflex camera generally has an electronic viewfinder and an optical viewfinder. A subject image formed by an image pickup optical system has its path switched to an optical viewfinder or an image pickup element with a movable mirror provided in an optical path.

In the optical viewfinder, no displacement occurs between a subject image in a recording image and a subject image displayed with the optical viewfinder, whereby an image pickup operation can be performed satisfactorily.

On the other hand, in the electronic viewfinder, a so-called live view mode can be realized, in which a real-time image generated by an image pickup element is displayed on a display portion. In the live view mode, it is not necessary to bring the eye into contact with a finder unlike the optical viewfinder, and an image can be captured easily at a high angle or a low angle.

The digital single-lens reflex camera with a live view mode is disclosed by, for example, JP 2001-272593 A.

However, in the conventional digital single-lens reflex camera, when an image is captured in a live view mode, it is difficult to display a real-time image on a display portion during an image pickup period and processing of image data.

Furthermore, there is a digital single-lens reflex camera with a so-called burst mode in which a plurality of image data are generated with a single image pickup operation. The burst mode can be used both during the use of an optical view finder and in a live view mode using an electronic view finder, and particularly in the live view mode, a period during which a real-time image cannot be displayed on a display portion as described above continues.

In the burst mode, a moving subject is captured in most cases. Therefore, the impossibility of visually recognizing an image of a subject during an image pickup period in the burst mode degrades the ease of use of the digital single-lens reflex camera.

SUMMARY OF THE INVENTION

Therefore, with the foregoing in mind, it is an object of the present invention to provide a digital camera in which the ease of use is enhanced by displaying generated image data or image data obtained by subjecting the generated image data to predetermined processing on a display portion every time image data is generated in a burst mode.

A digital camera according to the present invention has a movable mirror provided so as to enter or retract with respect to an optical path of an image pickup optical system for purpose of guiding a subject image to an optical viewfinder. The digital camera includes an image pickup element that captures the subject image formed by the image pickup optical system to generate image data when the movable mirror retracts from the optical path of the image pickup optical system, a display portion that displays the generated image data or image data obtained by subjecting the generated image data to predetermined processing, and a control portion having a live view mode controlling so that the generated image data or the image data obtained by subjecting the generated image data to predetermined processing is displayed as a moving image in real time on the display portion, and a burst mode generating a plurality of image data with a single image pickup operation. In the live view mode, the control portion controls so that the generated image data or the image data obtained by subjecting the generated image data to predetermined processing is displayed on the display portion every time image data is generated in the burst mode.

According to the above configuration, even in the burst mode in the live view mode, every time image data is generated, the generated image data or image data obtained by subjecting the generated image data to predetermined processing is displayed on the display portion, so that the movement of a subject can be recognized visually.

According to the present invention, a digital camera can be provided whose ease of use is enhanced in a burst mode of a digital camera having a movable mirror and that is capable of displaying a subject image in a live view with an electronic viewfinder.

DETAILED DESCRIPTION OF THE INVENTION

[1 Configuration of Digital Camera]

Hereinafter, the configuration of a camera 10 according to Embodiment 1 of the present invention will be described with reference to FIGS. 1 to 6.

[1-1. Outline of Entire Configuration]

Figure 1:
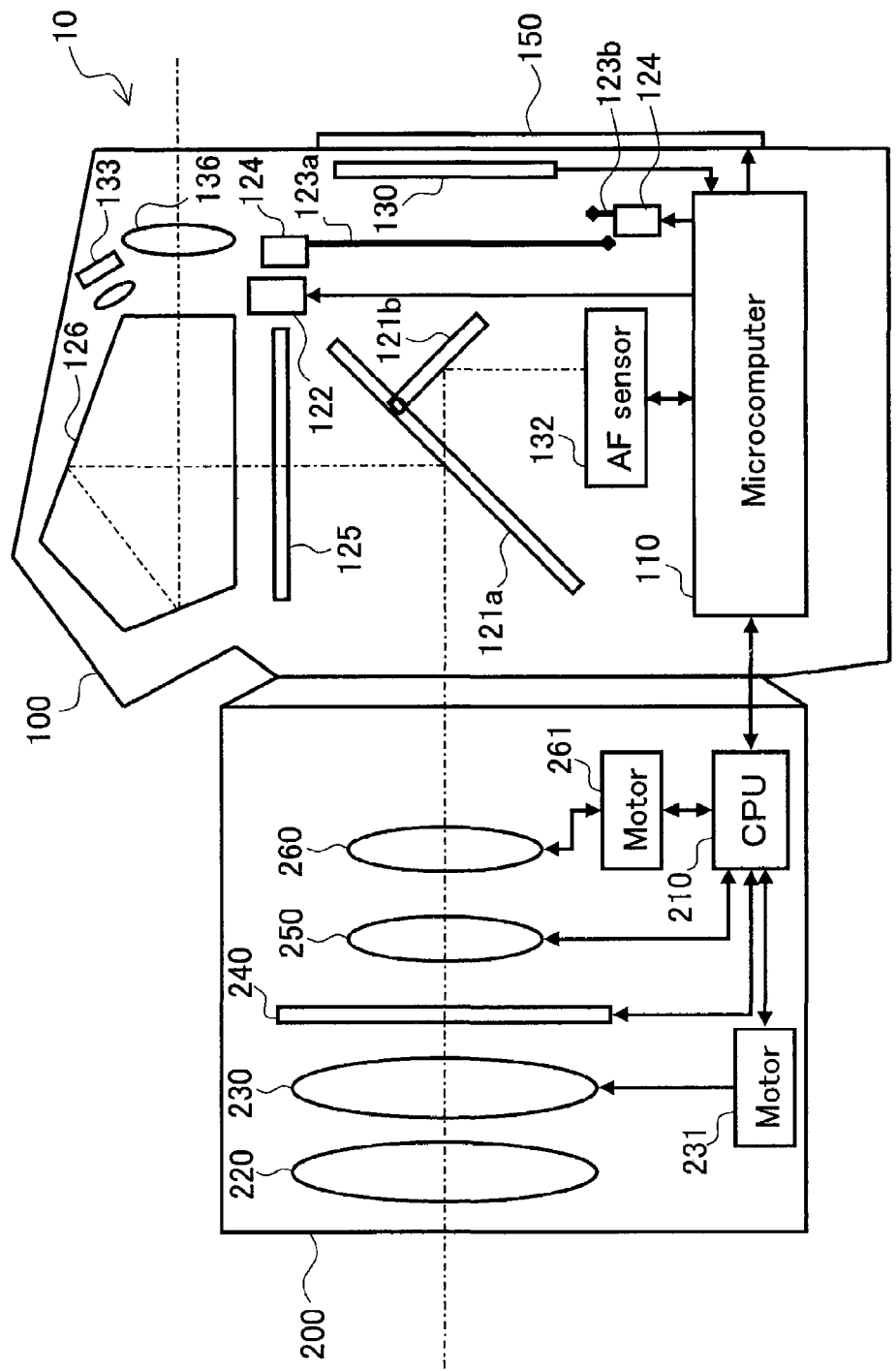
FIG. 1 is a schematic view illustrating an outline of a camera according to an embodiment of the present invention.

FIG. 1 is a schematic view illustrating an outline of the camera 10. The camera 10 is composed of a camera body 100 and an interchangeable lens 200 attachable/detachable with respect to the camera body 100.

The camera body 100 captures a subject image condensed by an optical system included in the interchangeable lens 200, and records it as image data. The camera body 100 includes a mirror box 120 (see FIG. 2). The mirror box 120 switches an optical path of an optical signal from the optical system included in the interchangeable lens 200 so as to allow the subject image to be incident selectively upon either a CMOS sensor 130 or an eyepiece 136. The mirror box 120 includes movable mirrors 121a, 121b, a mirror driving portion 122, a shutter 123, a shutter driving portion 124, a focusing glass 125, and a prism 126.

The movable mirror 121a is placed so as to enter/retract with respect to the optical path of an image pickup optical system so as to guide the subject image to an optical viewfinder. The movable mirror 121b is placed so as to enter/retract with respect to the optical path of the image pickup optical system together with the movable mirror 121a. The movable mirror 121b reflects a part of the optical signal input from the optical system included in the interchangeable lens 200 to allow it to be incident upon an autofocus (AF) sensor 132.

When the movable mirror 121a is positioned in the optical path of the image pickup optical system, a part of the optical signal input from the optical system included in the interchangeable lens 200 is incident upon the eyepiece 136 via the focusing glass 125 and the prism 126. Furthermore, the optical signal reflected by the movable mirror 121a is diffused by the focusing glass 125. Then, a part of the diffused optical signal is incident upon an AE sensor 133. On the other hand, when the movable mirrors 121a and 121b are not positioned in the optical path of the image pickup optical system, the optical signal input from the optical system included in the interchangeable lens 200 is incident upon the CMOS sensor 130.

The mirror driving portion 122 includes mechanical components such as a motor and a spring. Furthermore, the mirror driving portion 122 drives the movable mirrors 121a, 121b under the control of a microcomputer 110.

The shutter 123 can switch between the interruption and the passage of the optical signal incident via the interchangeable lens 200. The shutter driving portion 124 includes mechanical components such as a motor and a spring, and drives the shutter 123 based on the control of the microcomputer 110. The mirror driving portion 122 and the shutter driving portion 124 may use separate motors or have a common motor.

At the back of the camera body 100, a liquid crystal monitor 150 is placed. The liquid crystal monitor 150 is capable of displaying image data generated by the CMOS sensor 130 or image data obtained by subjecting the image data generated by the CMOS sensor 130 to predetermined processing.

The optical system in the interchangeable lens 200 includes an objective lens 220, a zoom lens 230, a diaphragm 240, a hand shaking correction unit 250, and a focus lens 260. A CPU 210 controls the optical system. The CPU 210 is capable of transmitting/receiving a control signal and information on the optical system with respect to the microcomputer 110 on the camera body 100 side.

[1-2. Configuration of Camera Body]

Figure 2:
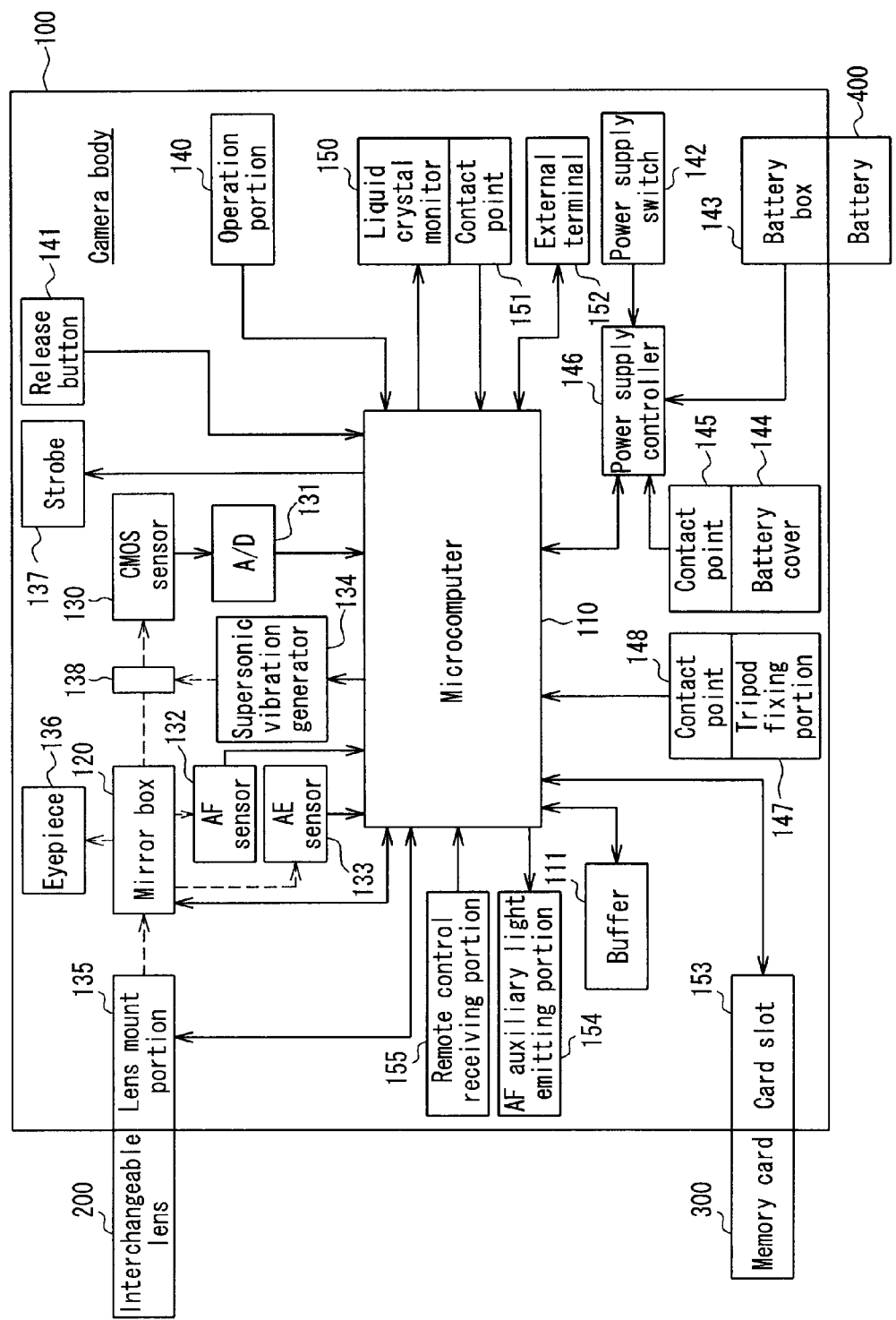
FIG. 2 is a block diagram showing a configuration of a camera body according to the embodiment of the present invention.

FIG. 2 is a block diagram showing a configuration of the camera body 100. As shown in FIG. 2, the camera body 100 has various sites, and the microcomputer 110 controls them. In the present embodiment, a description will be made in which one microcomputer 110 controls the entire camera body 100. However, the present embodiment may be configured so that a plurality of control portions control the camera body 100.

A lens mount portion 135 is a member that attaches/detaches the interchangeable lens 200. The lens mount portion 125 can be connected electrically to the interchangeable lens 200 using a connection terminal or the like, and also can be connected mechanically thereto using a mechanical member such as an engagement member. The lens mount portion 135 can output a signal from the interchangeable lens 200 to the microcomputer 110, and can output a signal from the microcomputer 110 to the interchangeable lens 200. The lens mount portion 135 has a hollow configuration. Therefore, the optical signal incident from the optical system included in the interchangeable lens 200 passes through the lens mount portion 135 to reach the mirror box 120.

The mirror box 120 guides the optical signal having passed through the lens mount portion 135 to the CMOS sensor 130, the eyepiece 136, the AF sensor 132, and the AE sensor 133 in accordance with the inside state. The switching of the optical signal by the mirror box will be described in "1-4 State of mirror box".

The CMOS sensor 130 electrically converts the optical signal incident through the mirror box 120 into an electric signal to generate image data. The generated image data is converted from an analog signal to a digital signal by an A/D converter 131 to be output to the microcomputer 110. The generated image data may be subjected to predetermined image processing while being output from the CMOS sensor 130 to the A/D converter 131 or while being output from the A/D converter 131 to the microcomputer 110.

The eyepiece 136 passes the optical signal incident through the mirror box 120. At this time, in the mirror box 120, as shown in FIG. 1, the optical signal incident from the interchangeable lens 200 is reflected by the movable mirror 121a to form a subject image on the focusing glass 125. Then, the prism 126 reflects the subject image to output it to the eyepiece 136. Consequently, a user visually can recognize the subject image from the mirror box 120. Herein, the eyepiece 136 may be composed of a single lens or a lens group including a plurality of lenses. Furthermore, the eyepiece 136 may be held on the camera body 100 in a fixed manner, or held thereon movably for the purpose of adjusting the visibility or the like. The optical viewfinder including the focusing glass 125, the prism 126, and the eyepiece 136 is configured in an optimum shape for displaying an image having a composition with an aspect ratio of 4:3. It should be noted that the optical viewfinder may be configured in an optimum shape for displaying an image having a composition with another aspect ratio. For example, the optical viewfinder may have an optimum shape for displaying an image having a composition with an aspect ratio of 16:9, or an optimum shape for displaying an image having a composition with an aspect ratio of 3:2.

A protective material 138 protects the surface of the CMOS sensor 130. By placing the protective material 138 on the front surface of the CMOS sensor 130, foreign matter such as dust can be prevented from adhering to the surface of the CMOS sensor 130. The protective material 138 can be formed of a transparent material such as glass or plastic.

A supersonic vibration generator 134 is activated in accordance with a signal from the microcomputer 110 to generate a supersonic vibration. The supersonic vibration generated in the supersonic vibration generator 134 is transmitted to the protective material 138. Because of this, the protective material 138 can vibrate to shake off foreign matter such as dust adhering to the protective material 138. The supersonic vibration generator 134 can be achieved, for example, by attaching a piezoelectric element to the protective material 138. In this case, the piezoelectric element can be vibrated by supplying an AC current to the piezoelectric element attached to the protective material 138.

A strobe 137 flashes in accordance with an instruction of the microcomputer 110. The strobe 137 may be contained in the camera body 100, or may be of a type attachable/detachable with respect to the camera body 100. In the case of an attachable/detachable strobe, it is necessary to provide a strobe attachment portion such as a hot shoe on the camera body 100.

A release button 141 receives an instruction from the user regarding the activation of an autofocus operation and a photometric operation, and also receives an instruction from the user regarding the start of capturing an image for recording by the CMOS sensor 130. The release button 141 can receive halfway depression and full depression. When the release button 141 is pressed halfway by the user in an autofocus mode, the microcomputer 110 instructs the interchangeable lens 200 to perform the autofocus operation based on a signal from the AF sensor 132. Furthermore, when the release button 141 is pressed halfway by the user in an automatic exposure mode, the microcomputer 110 instructs the interchangeable lens 200 to perform the photometric operation based on a signal from the AE sensor 133. On the other hand, when the release button 141 is pressed fully by the user, the microcomputer 110 controls the mirror box 120, the CMOS sensor 130, and the like to capture the image for recording. Then, the microcomputer 110 subjects the captured image for recording to YC conversion processing, resolution conversion processing, compression processing, or the like, if required, thereby generating image data for recording. The microcomputer 110 records the generated image data for recording on a memory card 300 via a card slot 153. The release button 141 can have a function of responding to the halfway depression and a function of responding to the full depression by allowing the release button 141 to contain two switches. In this case, one of the switches is switched to an ON state by the halfway depression, and the other switch is switched to an ON state by the full depression.

Figure 3:
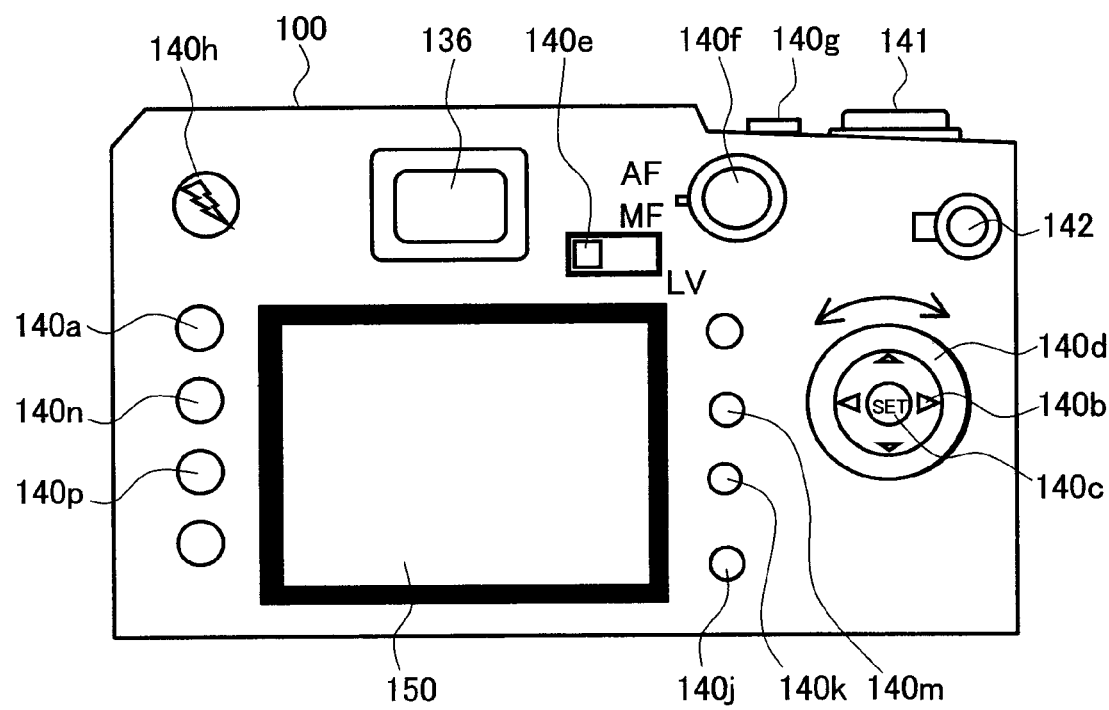
FIG. 3 is a back view of the camera body according to the embodiment of the present invention.

An operating portion 140 is a member for transmitting various instructions from the user to the microcomputer 110. In order to illustrate various operation members, a back view of the camera body 100 is shown in FIG. 3. The back surface of the camera body 100 includes a menu button 140a, a cross key 140b, a set button 140c, a rotation dial 140d, a viewfinder switch 140e, a focus mode switch 140f, a strobe activation button 140h, a live view (LV) preview button 140j, a stop-down button 140k, an AV button 140m, and a power supply switch 142. On the upper surface of the camera body 100, a hand shaking correction mode switch button 140g and the release button 141 are placed.

The menu button 140 allows the liquid crystal monitor 150 to display setting information on the camera 10, thereby enabling the user to change the setting. The cross key 140b selects various settings, items, images, or the like displayed on the liquid crystal monitor 150, and for example, can move a cursor or the like. The set button 140c determines the selected various settings, items, images, or the like displayed on the liquid crystal monitor 150. The rotation dial 140d is an operation member that selects various settings, items, images, or the like displayed on the liquid crystal monitor 150 in the same way as in the cross key 140b, and can move a cursor or the like, for example, by rotating. The viewfinder switch 140e selects either displaying a captured image on the eyepiece 136 or displaying the captured image on the liquid crystal monitor 150. The focus mode switch 140f selects either setting a focus mode in a manual focus mode or setting the focus mode in an autofocus mode. The hand shaking correction mode switch 140g selects whether hand shaking correction should be performed. Furthermore, the hand shaking correction mode switch 140g selects a control mode of hand shaking correction. The stop-down button 140k adjusts the diaphragm in the live view mode. The LV preview button 140j adjusts the diaphragm and displays a part of an image displayed on the liquid crystal monitor 150 in an enlarged state, in the live view mode. The AV button 140m adjusts the diaphragm in an optical viewfinder (OVF) mode.

Returning to FIG. 2, the liquid crystal monitor 150 receives a signal from the microcomputer 110 and displays an image or information on various settings. The liquid crystal monitor 150 is capable of displaying image data generated by the CMOS sensor 130, or image data obtained by subjecting the image data generated in the CMOS sensor 130 to predetermined processing. The liquid crystal monitor 150 is capable of displaying the image data held in the memory card 300 after subjecting the image data to predetermined processing such as decompression processing in the microcomputer 110, if required. As shown in FIG. 3, the liquid crystal monitor 150 is placed on the back surface of the camera body 100. The liquid crystal monitor 150 is placed rotatably with respect to the camera body 100. A contact point 151 detects the rotation of the liquid crystal monitor 150. The liquid crystal monitor 150 has an optimum shape for displaying an image having a composition with an aspect ratio of 4:3. It should be noted that the liquid crystal monitor 150 is also capable of displaying an image having a composition with another aspect ratio (e.g., 3:2 or 16:9) by the control of the microcomputer 110.

An external terminal 152 outputs image data and information on various settings to an external apparatus. The external terminal 152 is, for example, a universal serial bus (USB) terminal, a terminal for an interface pursuant to an Institute of Electrical and Electronic Engineers (IEEE) 1394 specification, or the like. Furthermore, when a connection terminal from the external apparatus is connected to the external terminal 152, the microcomputer 110 is notified of the connection.

A power supply controller 146 controls the supply of power from a battery 400 contained in a battery box 143 to members in a camera 10, such as the microcomputer 110. When the power supply switch 142 is switched on, the power supply controller 146 starts supplying the power from the battery 400 to the members in the camera 10. Furthermore, the power supply controller 146 includes a sleep function, and when the camera 10 remains unoperated for a predetermined period of time while in the ON state, the power supply controller 146 stops the supply of power (excluding a part of the circuit or a part of the electronic components in the camera 10). Furthermore, the power supply controller 146 notifies the microcomputer 110 that the battery cover 144 is opened, based on a signal from the contact point 145 that monitors the opening/closing of the battery cover 144. The battery cover 144 is a member that opens/closes an opening of the battery box 143. In FIG. 2, the power supply controller 146 is configured so as to supply power to each member in the camera 10 through the microcomputer 110. However, the power supply controller 146 may be configured so as to supply power directly from the power supply controller 146, if required.

A tripod fixing portion 147 is a member that fixes a tripod (not shown) to the camera body 100, and is composed of a screw or the like. The contact point 148 monitors whether or not the tripod is fixed to the tripod fixing portion 147, and notifies the microcomputer 110 of the result. The contact point 148 can be composed of a switch or the like.

The card slot 153 is a connector for accepting the memory card 300. The card slot 153 not only may be configured so as to include a mechanical portion for placing the memory card 300, but also be configured so as to include a control portion and/or software for controlling the memory card 300.

A buffer 111 is a memory for storing information temporarily when signal processing is performed in the microcomputer 110. Although information to be stored temporarily in the buffer 111 mainly is image data, a control signal and the like may be stored in the buffer 111. The buffer 111 may be composed of means capable of storing, such as a dynamic random access memory (DRAM), a static random access memory (SRAM), a flash memory, or a ferroelectric memory. The buffer 11 also may be a memory dedicated to storage.

An AF auxiliary light emitting portion 154 is a member that emits auxiliary light when an autofocus operation is performed in a dark photographing place. The AF auxiliary light emitting portion 154 emits light based on the control of the microcomputer 110. The AF auxiliary light emitting portion 154 includes a red light-emitting diode (LED) and the like.

A remote control receiving portion 155 receives a signal from a remote controller (not shown) and transmits the received signal to the microcomputer 110. The remote control receiving portion 155 typically includes a photodetector that receives infrared light from the remote controller.

[1-3 Configuration of Interchangeable Lens]

Figure 4:
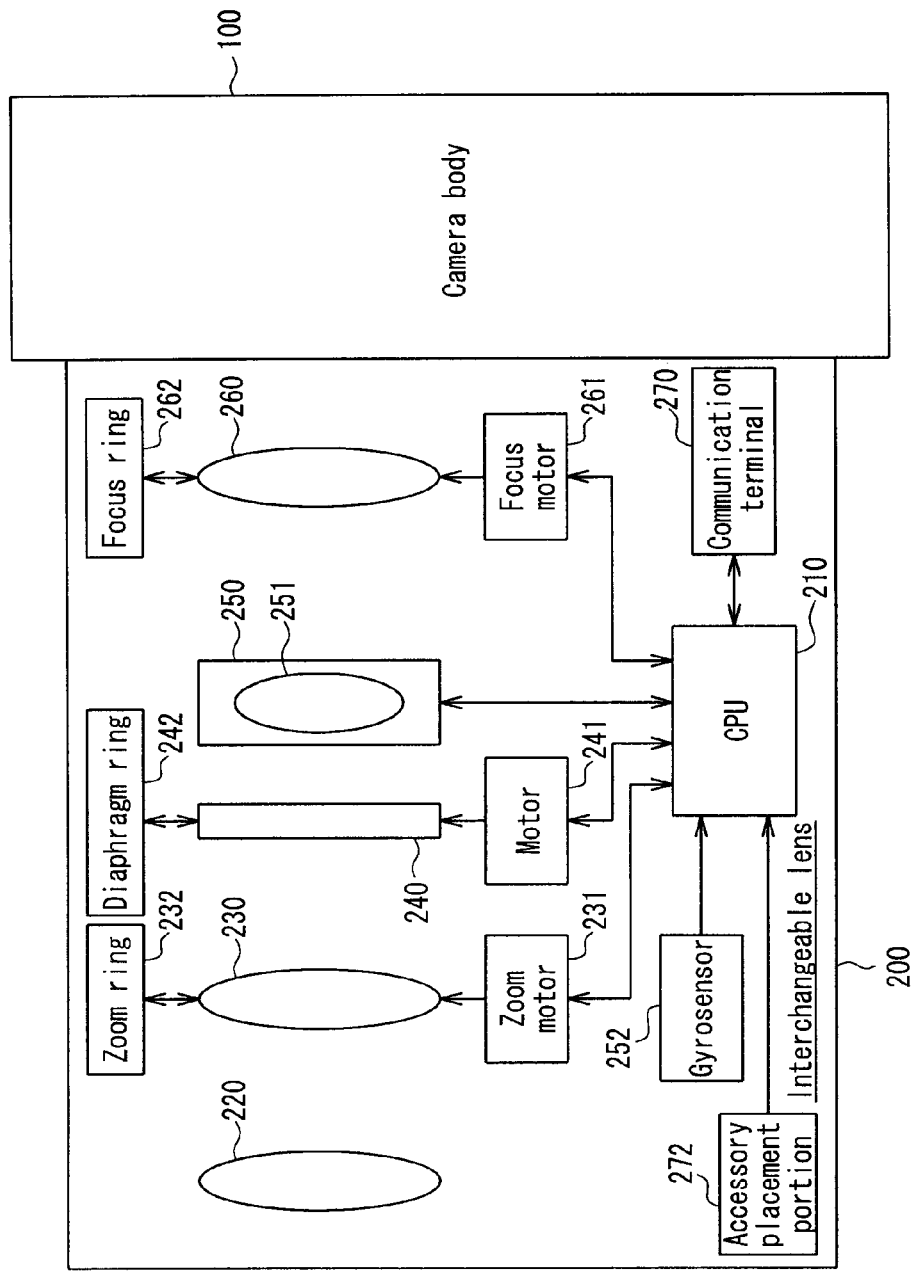
FIG. 4 is a block diagram showing a configuration of an interchangeable lens according to the embodiment of the present invention.

FIG. 4 is a block diagram showing a configuration of the interchangeable lens 200. The interchangeable lens 200 includes an image pickup optical system. Furthermore, the image pickup optical system and the like of the interchangeable lens 200 are controlled by the CPU 210.

The CPU 210 controls the operations of actuators such as a zoom motor 231, a diaphragm motor 241, the hand shaking correction unit 250, and a focus motor 261, thereby controlling the image pickup optical system. The CPU 210 sends information representing the states of the image pickup optical system, an accessory placement portion 272, and the like to the camera body 100 via a communication terminal 270. Furthermore, the CPU 210 receives a control signal or the like from the camera body 100, and controls the image pickup optical system and the like based on the received control signal or the like.

The objective lens 220 is placed closest to the subject side. The objective lens 220 may be movable in an optical axis direction or may be fixed.

The zoom lens 230 is placed on the image surface side from the objective lens 220. The zoom lens 230 is movable in the optical axis direction. By moving the zoom lens 230, the magnification of the subject image can be varied. The zoom lens 230 is driven with the zoom motor 231. The zoom motor 231 may be any motor such as a stepping motor or a servo motor, as long as it can drive at least the zoom lens 230. The CPU 210 monitors the state of the zoom motor 231 or the state of another member to monitor the position of the zoom lens 230.

The diaphragm 240 is placed on the image surface side from the zoom lens 230. The diaphragm 240 has an aperture with the optical axis at the center. The size of the aperture can be changed by the diaphragm motor 241 and a diaphragm ring 242. The diaphragm motor 241 is synchronized with a mechanism that changes the aperture size of the diaphragm to drive the mechanism, thereby changing the aperture size of the diaphragm. The diaphragm ring 242 also is synchronized with a mechanism that changes the aperture size of the diaphragm to drive the mechanism, thereby changing the aperture size of the diaphragm. An electrical control signal is given to the microcomputer 110 or the CPU 210 by the user, and the diaphragm motor 241 is driven based on the control signal. In contrast, the diaphragm ring 242 receives a mechanical operation from the user, and transmits this operation to the diaphragm 240. Furthermore, whether or not the diaphragm ring 242 has been operated can be detected by the CPU 210.

The hand shaking correction unit 250 is placed on the image surface side from the diaphragm 240. The hand shaking correction unit 250 includes a correction lens 251 that corrects hand shaking and an actuator that drives the correction lens 251. The actuator included in the hand shaking correction unit 250 can move the correction lens 251 in a plane orthogonal to an optical axis. A gyrosensor 252 measures an angular speed of the interchangeable lens 200. For convenience, in FIG. 4, although the gyrosensor 252 is shown with one block, the interchangeable lens 200 includes two gyrosensors 252. One of the two gyrosensors measures an angular speed with a vertical axis of the camera 10 being the center. Furthermore, the other gyrosensor measures an angular speed with a horizontal axis of the camera 10 perpendicular to the optical axis being the center. The CPU 210 measures a hand shaking direction and a hand shaking amount of the interchangeable lens 200 based on the angular speed information from the gyrosensor 252. The CPU 210 controls an actuator so as to move the correction lens 251 in a direction to cancel a hand shaking amount. Because of this, the subject image formed with the image pickup optical system of the interchangeable lens 200 becomes a subject image with hand shaking corrected.

The focus lens 260 is placed closest to the image surface side. The focus motor 261 drives the focus lens 260 in the optical axis direction. This can adjust the focus of the subject image.

The accessory placement portion 272 is a member that places an accessory such as a light-shielding hood at a tip end of the interchangeable lens 200. The accessory placement portion 272 is composed of mechanical members such as a screw and a bayonet. Furthermore, the accessory placement portion 272 includes a detector that detects whether or not an accessory has been placed. When the accessory is placed, the accessory placement portion 272 notifies the CPU 210 of the placement of the accessory.

[1-4 State of Mirror Box]

The state in the mirror box 120 in each operation state will be described with reference to FIGS. 1, 5, and 6.

FIG. 1 is a schematic view showing the state in the mirror box 120 in a mode of observing a subject image using the optical viewfinder. In the present specification, for convenience, this state will be referred to as a "state A". In the state A, the movable mirrors 121a, 121b are positioned in the optical path of the optical signal incident from the interchangeable lens 200. Therefore, a part of the optical signal from the interchangeable lens 200 is reflected by the movable mirror 121a, and the remaining part thereof is transmitted through the movable mirror 121a. The reflected optical signal passes through the focusing glass 125, the prism 126, and the eyepiece 136 to reach the user's eye. Furthermore, the optical signal reflected by the movable mirror 121a is reflected by the focusing glass 125, and a part of the reflected optical signal is incident upon the AE sensor 133. On the other hand, a part of the optical signal transmitted through the movable mirror 121a is reflected by the movable mirror 121b to reach the AF sensor 132. Furthermore, in the state A, a first shutter 123a is closed. Therefore, the optical signal from the interchangeable lens 200 does not reach the CMOS sensor 130. Thus, in the state A, the observation of the subject image using the optical viewfinder, the autofocus operation using the AF sensor 132, and the photometric operation using the AE sensor 133 can be performed. However, the observation of the subject image using the liquid crystal monitor 150, the recording of the image data generated by the CMOS sensor 130, and the autofocus operation using the contrast of the image data generated by the CMOS sensor 130 cannot be performed.

Figure 5:
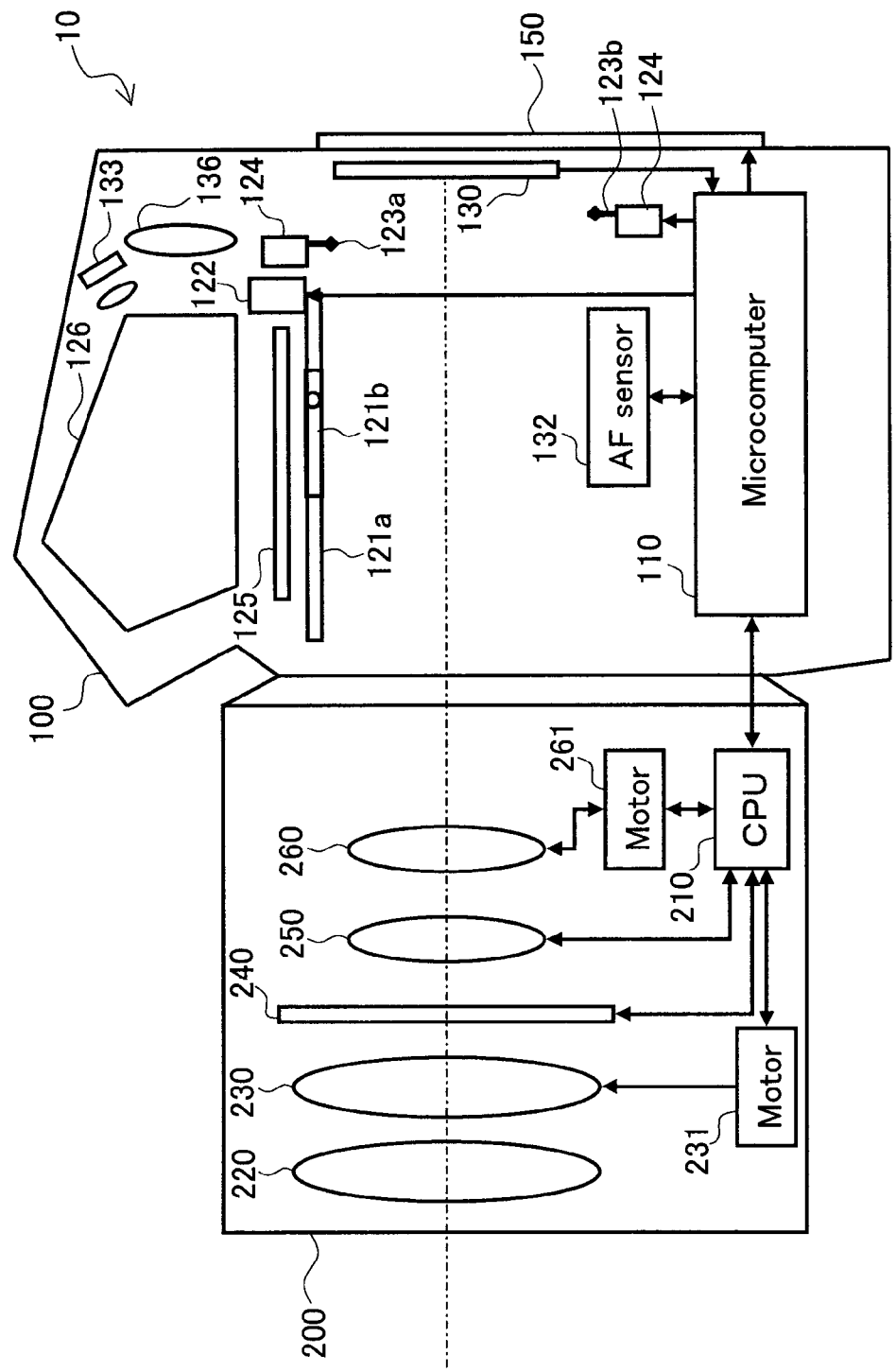
FIG. 5 is a schematic view when the inside of a mirror box of the camera according to the embodiment of the present invention is in a state B.

FIG. 5 is a schematic view showing the state in the mirror box 120 in a mode in which the subject image is input to the CMOS sensor 130. In the specification, for convenience, this state will be referred to as a "state B". In the state B, the movable mirrors 121a, 121b are not positioned in the optical path of the optical signal incident from the interchangeable lens 200. Therefore, the optical signal from the interchangeable lens 200 does not pass through the focusing glass 125, the prism 126, and the eyepiece 136 to reach the user's eye, and does not reach the AF sensor 132 and the AE sensor 133, either. Furthermore, in the state B, the first shutter 123a and the second shutter 123b are opened. Therefore, the optical signal from the interchangeable lens 200 reaches the CMOS sensor 130. Thus, in the state B, contrary to the state A, the observation of the subject image using the liquid crystal monitor 150, the recording of the image data generated by the CMOS sensor 130, and the autofocus operation using the contrast of the image data generated by the CMOS sensor 130 can be performed. However, the observation of the subject image using the optical viewfinder, the autofocus operation using the AF sensor 132, and the photometric operation using the AE sensor 133 cannot be performed. The movable mirrors 121a, 121b, and the first shutter 123a are biased in a direction in which the state A is shifted to the state B by biasing means such as a spring. Therefore, the state A can be shifted to the state B instantaneously, which is preferable for starting exposure.

Figure 6:
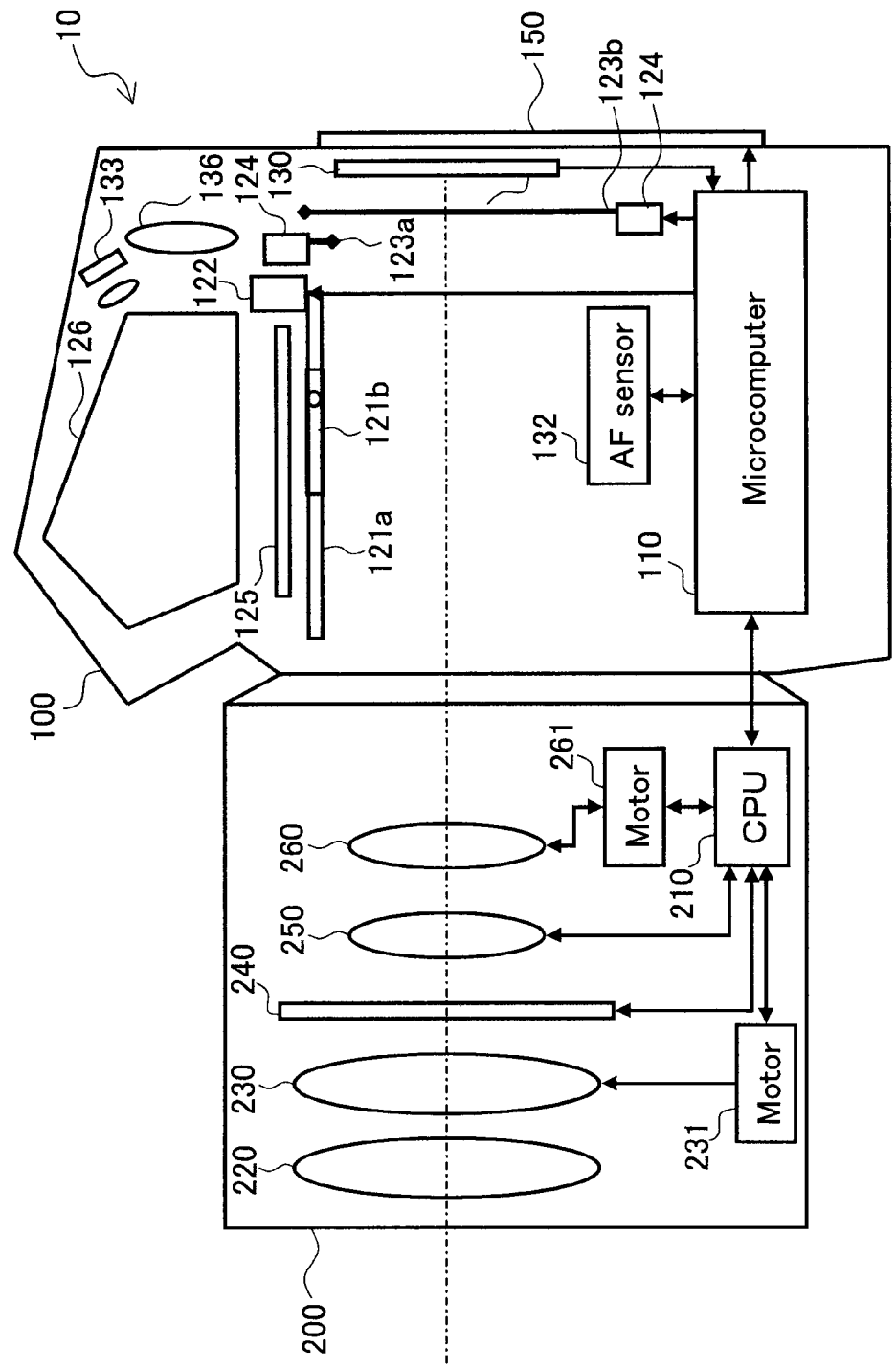
FIG. 6 is a schematic view when the inside of the mirror box of the camera according to the embodiment of the present invention is in a state C.

FIG. 6 is a schematic view showing the state in the mirror box 120 immediately after the exposure of the subject image with respect to the CMOS sensor 130 is completed. In the present specification, for convenience, this state will be referred to as a "state C". In the state C, the movable mirrors 121a, 121b are not positioned in the optical path of the optical signal incident from the interchangeable lens 200. Therefore, the optical signal from the interchangeable lens 200 does not pass through the focusing glass 125, the prism 126, and the eyepiece 136 to reach the user's eye, and does not reach the AF sensor 132 and the AE sensor 133, either. Furthermore, in the state C, the second shutter 123b is closed while the first shutter 123a is opened. Therefore, the optical signal from the interchangeable lens 200 does not reach the CMOS sensor 130. Thus, in the state C, the observation of the subject image using the liquid crystal monitor 150, the recording of the image data generated by the CMOS sensor 130, the autofocus operation using the contrast of image data generated by the CMOS sensor 130, the observation of the subject image using the optical viewfinder, the autofocus operation using the AF sensor 132, and the photometric operation using the AE sensor 133 cannot be performed. The second shutter 123b is biased in the closing direction, so that the state B can be shifted to the state C instantaneously. Therefore, the state C is in a state optimum for completing the exposure of the CMOS sensor 130.

As described above, the state A can be shifted to the state B directly. In contrast, the state B cannot be shifted to the state A without the state C, in terms of the constriction of the mechanism of the mirror box 120. However, this is a technical problem in the mechanism in the mirror box 120, so that a mechanism capable of directly shifting the state B to the state A without the state C may be adopted.

[1-5 Correspondence Between Configuration of Present Embodiment and Configuration of Present Invention]

The configuration including the focusing glass 125, the prism 126, and the eyepiece 136 is an example of an optical viewfinder of the present invention. The optical system including the objective lens 220, the zoom lens 230, the correction lens 251, and the focus lens 260 is an example of an image pickup optical system of the present invention. The movable mirrors 121a, 121b are examples of a movable mirror of the present invention. The CMOS sensor 130 is an example of an image pickup element of the present invention. The liquid crystal monitor 150 is an example of a display portion of the present invention. The microcomputer 110 is an example of a control portion of the present invention. In this case, the control portion may include the CPU 210 in addition to the microcomputer 110. The menu button 140a, the cross key 140b, the set button 140c, the rotation dial 140d, and the CPU 210 are examples of review switching portions of the present invention. The review refers to a function capable of rapidly checking an image photographed immediately before. The viewfinder switch 140e is an example of a viewfinder switching portion of the present invention. A sensor detecting the contact of the eye may be provided in the vicinity of the eyepiece 136. In this case, when the contact of the eye is detected, a mode of observing a subject image with an optical viewfinder may be set, and when the contact of the eye is not detected, a live view mode may be set.

[2 Operation of Digital Camera]

The operation of the camera 10 in Embodiment 1 of the present invention configured as described above will be described with reference to FIG. 7.

[2-1 Display Operation of Real-Time Image]

The display operation for observing the subject image formed by the interchangeable lens 200 in real time will be described. As the display operation, two operations are set. The first one is an operation using the optical viewfinder, and the second one is an operation using the liquid crystal monitor 150. These operations will be described below in detail.

In the specification, the function and display of displaying a subject image on the liquid crystal monitor 150 in real time will be referred to as "live view". Furthermore, the control mode of the microcomputer 110 when a live view operation is performed as such will be referred to as a "live view mode".

In the live view, a subject image only needs to be displayed on the liquid crystal monitor 150 in real time, and the image data displayed on the liquid crystal monitor 150 may or may not be stored simultaneously in storage means such as the memory card 300.

Furthermore, when the live view is displayed, it is necessary to allow the optical signal from the interchangeable lens 200 to reach the CMOS sensor 130, so that the inside of the mirror box 120 needs to be shifted to the state B shown in FIG. 5. However, even if the microcomputer 110 is set in the live view mode, it is necessary to set the inside of the mirror box 120 to the state A or the state C in addition to the state B, in accordance with each state of the image pickup operation, autofocus operation, automatic exposure control operation, or the like, and a period during which the liquid crystal monitor 150 cannot display a live view also occurs.

Furthermore, as described above, in the live view, a subject image is displayed on the liquid crystal monitor 150 in real time. However, the term "real time" does not have a strict meaning, and there may be some time delay from an actual operation of a subject as long as the user can feel real time in a common sense. The liquid crystal monitor 150 generally is considered to perform a live view display with a time delay of about 0.1 seconds (this time may be some longer or shorter depending upon the hardware and the like of the camera 10), and the case of a delay of about 1 to 5 seconds may be included in the concept of the live view display as a subject image display in real time.

The user can switch between the live view mode and the OVF mode by sliding the viewfinder switch 140e shown in FIG. 3.

When the user slides the viewfinder switch 140e to the OVF mode side, the microcomputer 110 is set in the OVF mode. Then, the microcomputer 110 controls the mirror driving portion 122 and the shutter driving portion 124 to shift the inside of the mirror box 120 to the state A shown in FIG. 1. Consequently, the user can observe a subject image in real time through the eyepiece 136. Furthermore, in the state A, as described above, the autofocus operation using the AF sensor 132 and the photometric operation using the AE sensor 133 can be performed.

When the user slides the viewfinder switch 140e from the OVF mode to the live view mode, the microcomputer 110 is set in the live view mode. Then, the microcomputer 110 controls the mirror driving portion 122 and the shutter driving portion 124 to set the inside of the mirror box 120 in the state B shown in FIG. 5. Consequently, the user can observe a subject image in real time, using the liquid crystal monitor 150.

[2-2. Image Pickup Operation of Image for Recording]

Hereinafter, an operation in the case of capturing an image for recording will be described. In order to capture an image for recording, it is necessary to adjust a focus intended by the user previously. As a method for adjusting a focus, there are a manual focus system, a single focus system, a continuous focus system, and the like.

By operating the focus mode switch 140f, the manual focus mode and the autofocus mode can be switched therebetween. Furthermore, by pressing the menu button 140a to call up a menu screen, either the signal focus mode or the continuous focus mode can be selected in the autofocus mode.

Herein, the case where a single focus mode is used in image pickup in a live view mode will be described.

Figure 7:
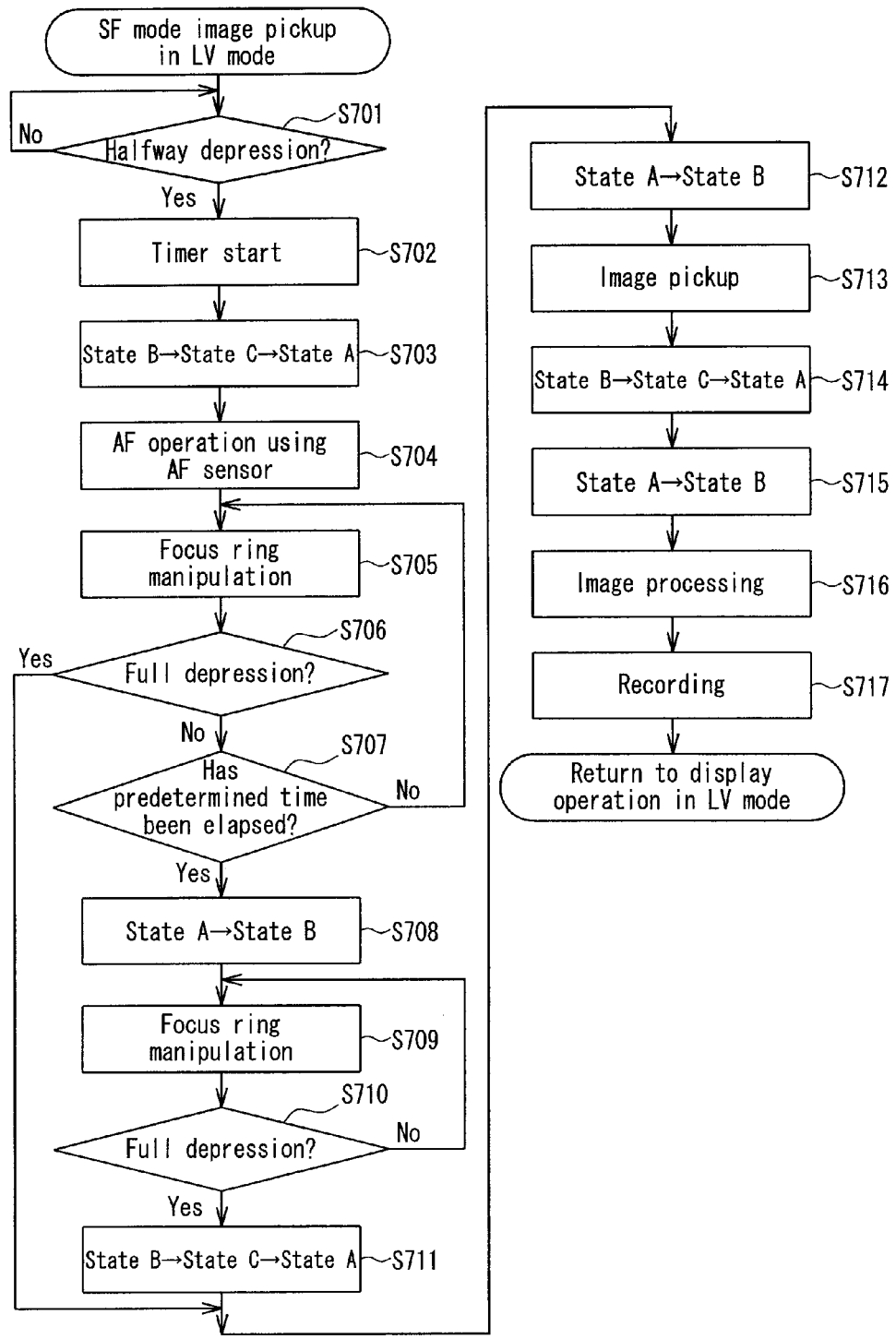
FIG. 7 is a flowchart illustrating an operation when an image is captured using a liquid crystal monitor 150 in a single focus mode.

FIG. 7 is a flowchart illustrating an operation when an image is captured using the liquid crystal monitor 150 in the single focus mode.

In the case of capturing an image in the live view mode, the inside of the mirror box 120 originally is in the state B shown in FIG. 5. The user adjusts a focus and a composition while checking a subject image through the liquid crystal monitor 150 before capturing the image. The microcomputer 110 monitors whether or not the user presses the release button 141 halfway so as to adjust a focus (S701). When the user presses the release button 141 halfway, the microcomputer 110 starts a timer in the microcomputer 110 (S702). The microcomputer 110 shifts the inside of the mirror box 120 from the state B to the state A via the state C in parallel with Step S702 (S703), and starts the autofocus operation based on the measurement results of the AF sensor 132 and locks the focus state thus obtained (S704). The reason why the inside of the mirror box 120 is shifted to the state A in S703 is to measure a distance with the AF sensor 132.

Even after the focus is locked, manual focus adjustment using the focus ring 262 can be performed (S705). The microcomputer 110 monitors whether or not the release button 141 is pressed fully while the focus ring 262 is being operated (S706).

In parallel with this, the microcomputer 110 monitors whether or not the release button 141 is pressed fully before a predetermined time elapses after the halfway depression (S707). When the release button 141 is pressed fully before a predetermined time elapses after the release button 141 is pressed halfway, the microcomputer 110 is shifted to Step S712, and starts an image pickup operation immediately. On the other hand, when a predetermined time elapses after the halfway depression with the release button 141 not pressed fully, the microcomputer 110 is shifted to Step S708.

In Step S708, the microcomputer 110 shifts the inside of the mirror box 120 from the state A to the state B. Because of this, the camera 10 can display a subject image on the liquid crystal monitor 150 under the condition that a focus is locked. Therefore, the user can determine a favorite composition by watching an image displayed on the liquid crystal monitor 150 while keeping the focus in a favorite state.

In this state, the microcomputer 110 monitors whether or not the release button 141 is pressed fully (S710). While Step S710 is being performed, a focus state can be changed manually using the focus ring 262 in the same way as in Step S704 (S709).

During Steps S701 to S710, when the halfway depression of the release button 141 is cancelled, the microcomputer 110 cancels a focus lock, and returns the state to the one in which an autofocus can be performed again. Therefore, when the release button 141 is pressed halfway again, a new focus state is locked.

Upon detecting that the release button 141 has been pressed fully, the microcomputer 110 controls the mirror driving portion 122 and the shutter driving portion 124 to shift the inside of the mirror box 120 from the state B to the state A via the state C (S711). The reason for once setting the inside of the mirror box 120 in the state A is to once disconnect an optical signal incident upon the CMOS sensor 130 with the shutter 123 to allow the CMOS sensor 130 to prepare for the start of exposure. Examples of the preparation for the start of exposure include the removal of unnecessary charge in each pixel.

The microcomputer 110 controls the mirror driving portion 122 and the shutter driving portion 124 to shift the inside of the mirror box 120 from the state A to the state B (S712). In this state, the microcomputer 110 exposes an optical signal from the interchangeable lens 200 to the CMOS sensor 130, thereby allowing an image for recording to be captured (S713). When a time corresponding to a shutter speed has elapsed, the microcomputer 110 controls the shutter driving portion 124 so as to close the second shutter 123b, and completes the exposure (State C). After that, the microcomputer 110 returns the inside of the mirror box 120 to the state A (S714).

When the exposure is completed, and the inside of the mirror box 120 is set in the state A (S714), the microcomputer 110 returns the inside of the mirror box 120 to the state B again, thereby re-starting the live view display (S715). In parallel with this, the microcomputer 110 performs image processing and recording of an image for recording (S716, S717).

More specifically, the microcomputer 110 receives the image data generated by the CMOS sensor 130, and temporarily stores it in the buffer 111. The image data stored at this time is, for example, image data composed of an RGB component. The microcomputer 110 subjects the image data stored in the buffer 111 to predetermined image processing such as YC conversion processing, resizing processing, and compression processing, thereby generating image data for recording (S716). The microcomputer 110 finally generates an image file pursuant to, for example, an Exchangeable image file format (Exif) specification. The microcomputer 110 allows the generated image file to be stored in the memory card 300 via the card slot 153 (S717).

As described above, merely by pressing the release button 141 halfway, after the movable mirror 121 is moved down to measure a distance, the camera 10 returns to the live view mode. Because of this, with a simple operation of pressing the release button 141 halfway, the operations from the autofocus operation using the AF sensor 132 to the live view display can be performed easily. Therefore, the user can adjust a composition in the live view display when a subject is focused by a simple operation.

Furthermore, when the user desires to change a composition while watching the liquid crystal monitor 150 after determining a focus state, the user only needs to wait until a predetermined time elapses after pressing the release button 141 halfway. On the other hand, in the case of pressing the release button 141 fully immediately after pressing it halfway, an image starts being captured without a live view display (S708-S711 are skipped in S706), so that a time from the halfway depression to the start of capturing an image can be shortened. This is because the movable mirror is prevented from being moved up/down unnecessarily. Therefore, the user can capture a favorite image without letting a shutter timing slip away.

A live view cannot be displayed in the autofocus operation (S704) and the image pickup operation (S713). This is because the movable mirror 121 is moved down in the autofocus operation (S704). Furthermore, in the image pickup operation (S713), it is difficult for the CMOS sensor 130 to output image data during exposure.

In Steps S716 and S717, the inside of the mirror box 120 is in the state B, so that a live view display can be performed. However, in Steps S716 and S717, most of the control ability of the microcomputer 110 is allocated to image processing and recording processing. Therefore, in Steps S716 and S717, it is preferable that the burden on the microcomputer 110 other than the image processing and recording processing is minimized. In Steps S716 and S717, a live view display is not conducted. Consequently, it is not necessary for the microcomputer 110 to use the processing ability for a live view display, so that the image processing and recording processing can be performed rapidly. An example of the form in which a live view display is not performed is a black out state of the liquid crystal monitor 150. A live view image stored in the buffer 111 before the full depressing may be displayed. Furthermore, information representing setting information and operation information of the camera 10 may be displayed.

[2-3. Image Pickup Operation of Burst Mode]

The menu button 140a, the cross key 140b, the set button 140c, the rotation dial 140d that are review switching portions of the present invention are operated to set a burst mode. In the burst mode, when the release button 141 has been pressed fully, the operations in Steps S711 to S717 are performed a predetermined number of times at a previously set interval. The burst mode can be set in either of the live view mode and the OVF mode. In the present specification, the burst mode in the live view mode will be described.

In the case of signal image pickup, as described above, in Steps S713 to S717, a live view display may not be performed. However, in a burst mode in which a plurality of image data are generated with a single image pickup operation, a period during which a real-time image cannot be displayed on a display portion continues. In the burst mode, a moving subject mostly is captured, so that the impossibility of visually recognizing an image of a subject during an image pickup period in a burst mode greatly degrades the ease of use of the digital single-lens reflex camera.

In Step S716, every time image pickup is completed, image data for display is generated from image data temporarily stored in the buffer 111 and displayed on the liquid crystal monitor 150. Consequently, since an image displayed on the liquid crystal monitor 150 is updated at a previously set interval, although not a real-time image, an image of a subject can be recognized visually.

[3. Another Embodiment]

[3-1. Relationship with Review Switching Portion]

Even if generated image data or image data obtained by subjecting the generated image data to predetermined processing is set so as not to be displayed by the menu button 140a, the cross key 140b, the set button 140c, and the rotation dial 140d that are review switching portions of the present invention, in a live view mode, irrespective of the setting, every time image data is generated in a burst mode, the generated image data or the image data obtained by subjecting the generated image data to predetermined processing may be displayed on the liquid crystal monitor 150.

Even if the generated image data or the image data obtained by subjecting the generated image data to predetermined processing are set so as not to be displayed by the review switching portions, a subject generally is moving in a burst mode, so that it is preferable in terms of the enhancement of the ease of use of the camera to display the generated image data or the image data obtained by subjecting the generated image data to predetermined processing on the liquid crystal monitor 150, thereby visually recognizing the movement of a subject.

[3-2. Relationship with Respect to Movable Mirror]

In the camera 10 according to Embodiment 1, the operations in Steps S711 to S717 are performed a previously set number at a previously set interval. Therefore, the movable mirrors 121a, 121b repeat entering/retracting with respect to an optical path of an image pickup optical system by a previously set number. When the movable mirrors 121a, 121b enter the optical path of the image pickup optical system, an autofocus operation can be performed, so that the autofocus operation may be set to be performed every time before image data is generated in a burst mode.

Even when the distance between the camera 10 and the subject varies depending upon the movement of a subject, if an autofocus operation is set to be performed every time before image data is generated in a burst mode, an image that is always focused can be obtained. Furthermore, the mirror driving portion 122 and the shutter driving portion 124 always are operated in synchronization. Therefore, a part of these driving portions is shared, whereby the miniaturization and the reduction in cost of the camera can be performed.

On the other hand, when the distance between the camera 10 and the subject does not vary depending upon the movement of a subject, while image data is being generated in a burst mode, the movable mirrors 121a, 121b may be controlled so as to be retracted from the optical path of the image pickup optical system. A time for driving the movable mirrors 121a, 121b is not necessary, so that continuous firing can be performed rapidly.

[3-3. Relationship with Respect to Viewing Finder Switching Portion]

When the optical viewfinder is set to be used by the viewfinder switch 140e, even if image data is generated in a burst mode, the generated image data or the image data obtained by subjecting the generated image data to predetermined processing may be controlled so as not to be displayed on the liquid crystal monitor 150.

In the case where the user is using the optical viewfinder by bringing the eye into contact with the eyepiece 136, when the movable mirrors 121a, 121b enter the optical path of the image pickup optical system, a subject can be recognized visually. At this time, when the liquid crystal monitor 150 emits light for a display in the vicinity of the eyepiece 136, the visual recognition of the subject with the optical viewfinder is prevented, so that it is preferable to control so as not to display generated image data or image data obtained by subjecting the generated image data to predetermined processing on the liquid crystal monitor 150.

When the optical viewfinder is set so as to be used by the viewfinder switch 140e, the finally generated image data in a burst mode or image data obtained by subjecting the finally generated image data to predetermined processing may be displayed on the liquid crystal monitor 150. When the live view mode is set so as to be used by the viewfinder switch 140e, every time image data is generated in a burst mode, the generated image data or the image data obtained by subjecting the generated image data to predetermined processing may be displayed on the liquid crystal monitor 150.

Even when the optical viewfinder is being used, after the completion of a burst mode, the finally generated image data in the burst mode or the image data obtained by subjecting the finally generated image data to predetermined processing can be recognized visually by the liquid crystal monitor 150, so that the ease of use of the camera can be enhanced.

According to the present invention, every time image data is generated in a burst mode, the generated image data or image data obtained by subjecting the generated image data to predetermined processing can be displayed on a display portion. Therefore, the present invention is useful for the application to a digital camera having a movable mirror, which enables a subject image to be observed through an electronic viewfinder.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A digital camera having a movable mirror provided so as to enter or retract with respect to an optical path of an image pickup optical system for purpose of guiding a subject image to an optical viewfinder, comprising:
    an image pickup element that captures the subject image formed by the image pickup optical system to generate image data when the movable mirror retracts from the optical path of the image pickup optical system;
    a display portion that displays the generated image data or image data obtained by subjecting the generated image data to predetermined processing; and
    a control portion having a live view mode controlling so that the generated image data or the image data obtained by subjecting the generated image data to predetermined processing is displayed as a moving image in real time on the display portion, and a burst mode generating a plurality of image data with a single image pickup operation,
    wherein, in the live view mode, the control portion controls so that the generated image data or the image data obtained by subjecting the generated image data to predetermined processing is displayed on the display portion every time image data is generated in the burst mode.

2. The digital camera according to claim 1, further comprising a review switching portion switching whether or not the generated image data or the image data obtained by subjecting the generated image data to predetermined processing is displayed after image pickup,
    wherein, irrespective of setting of the review switching portion, in the live view mode, the control portion controls so that the generated image data or the image data obtained by subjecting the generated image data to predetermined processing is displayed on the display portion every time image data is generated in the burst mode.

3. The digital camera according to claim 1, wherein, in the live view mode, the control portion controls so that the movable mirror retracts from the optical path of the image pickup optical system while image data is being generated in the burst mode.

4. The digital camera according to claim 1, wherein, in the live view mode, the control portion controls so that the movable mirror enters the optical path of the image pickup optical system, whereby an autofocus operation is performed with respect to the image pickup optical system, every time before image data is generated in the burst mode.

5. The digital camera according to claim 1, further comprising a viewfinder switching portion switching between a use of the optical viewfinder and a use of the live view mode,
    wherein, in a case where the viewfinder switching portion is set to the use of the optical viewfinder, the control portion controls so that the generated image data or the image data obtained by subjecting the generated image data to predetermined processing is not displayed on the display portion, even if image data is generated in the burst mode.

6. The digital camera according to claim 1, further comprising a viewfinder switching portion switching between a use of the optical viewfinder and a use of the live view mode,
    wherein, in a case where the viewfinder switching portion is set to the use of the optical viewfinder, when final image data is generated in the burst mode, the control portion controls so that the final image data or image data obtained by subjecting the final image data to predetermined processing is displayed on the display portion, and
    in a case where the viewfinder switching portion is set to the use of the live view mode, the control portion controls so that the generated image data or the image data obtained by subjecting the generated image data to predetermined processing is displayed on the display portion, every time image data is generated in the burst mode.

* * * * *